April 2, 1963  F. W. LÜCK  3,083,894
ROTARY PISTON ENGINE
Filed July 11, 1957

Inventor:
FRIEDRICH W. LÜCK
by

000
United States Patent Office 3,083,894
Patented Apr. 2, 1963

3,083,894
ROTARY PISTON ENGINE
Friedrich Wilhelm Lück, Berlin-Tegel, Germany, assignor to Borsig Aktiengesellschaft, Berlin-Tegel, Germany, and Felix Wankel, Lindau (Bodensee), Germany
Filed July 11, 1957, Ser. No. 671,685
Claims priority, application Germany July 11, 1956
2 Claims. (Cl. 230—141)

The present invention relates to rotary piston engines and, more particularly concerns a rotary piston engine for gaseous working media, which is provided with rotary pistons eccentrically arranged within each other and directly coupled to each other while at least the outer rotary piston is journalled in overhung position. The heretofore known machines of this type do, however, not meet modern requirements as to output efficiency and cooling as well as smooth running operation.

It is, therefore, an object of this invention to provide an improved rotary piston engine of the above mentioned general character.

It is another object of this invention to provide a rotary piston engine for gaseous working media which will considerably reduce the heretofore flow losses occurring in connection with the gas supply and gas discharge.

It is a further object of this invention to provide a rotary piston engine of the above mentioned type, which will considerably facilitate the lubrication of the bearings, even if high speed rotary piston engines are involved.

It is also an object of this invention to provide a simplified cooling of the bearings of rotary piston engines in which high gas pressures and accordingly high bearing temperatures would otherwise occur.

These and other objects and advantages of the invention will appear more clearly from the following specification in connection with the accompanying drawings, in which.

Figure 2:
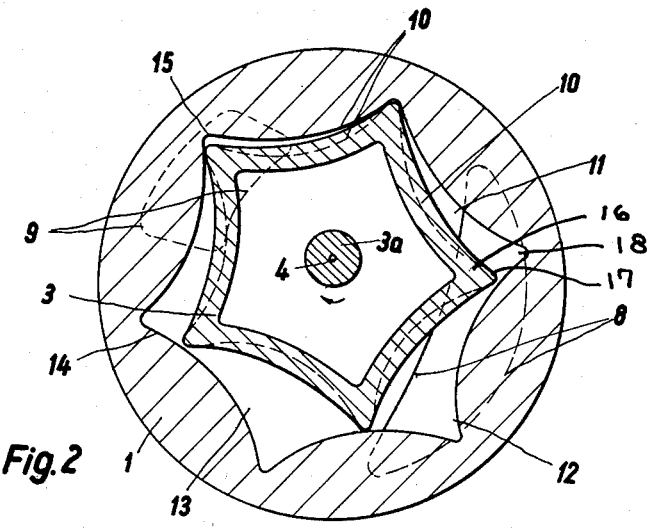
FIG. 2 is a section along the line II—II of FIG. 1.
Figure 1:
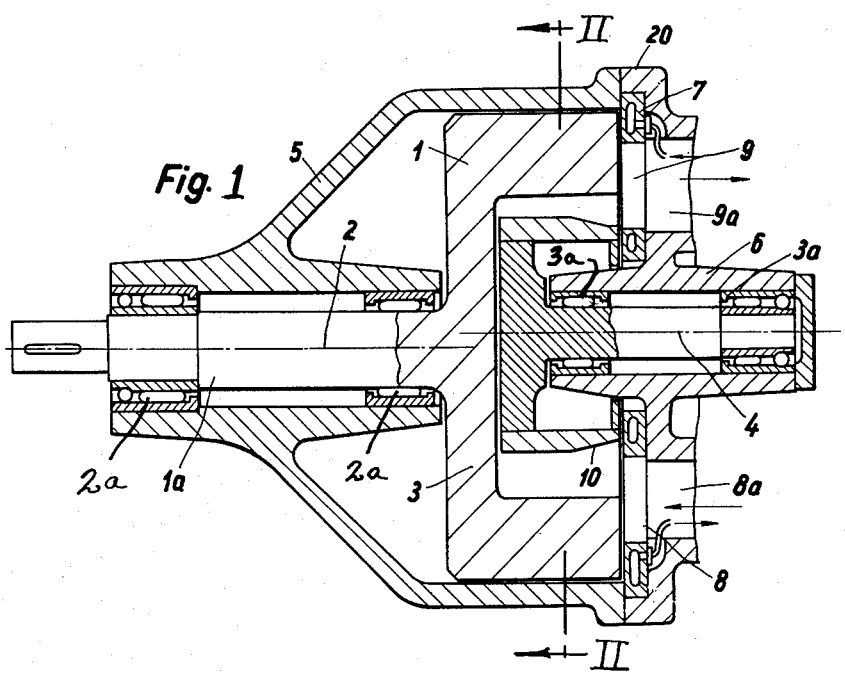
FIG. 1 represents a longitudinal sectional view of a rotary piston compressor according to the invention with the outer and inner rotary pistons arranged in overhung position.

In order considerably to increase the output of a rotary piston engine of the type involved and to create a high output rotary piston engine for gaseous working media, the rotary pistons are in conformity with the present invention so designed that the total space between the outer and the inner rotary piston will in a manner known per se continuously take part in the gas changing, i.e. compression or expansion operation while the working means is admitted and discharged through the open end walls of the outer rotary piston. Furthermore, the outer rotary piston alone performs the work through its shaft journal while the inner rotary piston which is carried along by the outer rotary piston idles as bearing in view of its structure adapted to bring about an equalization of the torques.

If such a machine is equipped with high eccentricity, it is suitable for a high throughput or a high weight rate of flow at low space requirements and high circumferential speed, while the teeth of the rotary pistons are subjected to minor wear only. Such high eccentricity is obtainable only with only slightly rounded tooth tips of the inner rotary piston and with not too high a number of teeth. Together with low leakage losses which are obtained in view of the smallest possible structural volume and thereby shortest sealing gap, the above mentioned means assure a high degree of delivery and efficiency, particularly since dead spaces in the rotary pistons will be avoided. While the outer rotary piston has to be journalled in an overhung position in view of its open end side, the inner rotary piston may, if desired, likewise be arranged in overhung position or it may also be directly journalled in the interior of the outer rotary piston.

The most characteristic features of the rotary piston engine according to the present invention are as follows: the feeding and discharge of the working medium is effected through a large inlet and outlet slot respectively. These slots are arranged either in an end wall of the casing or in an adjustable fixedly or rotatably mounted end disc which can be used in a simple manner for controlling and regulating purposes. The large slots reduce the high flow losses during the feeding and discharge of the gaseous medium as they occur frequently with heretofore known rotary piston engines. Inasmuch as furthermore the inner rotary piston with its flanks which are nearly radially directed at the tips thereof take charge of the control, it is above all possible quickly to close the feeding inlet at the end of the feeding period and also quickly to open the discharge at the beginning of the discharge operation.

The circumferential surface of the inner rotary piston or correspondingly also the inner circumferential surface of the outer rotary piston may be beveled at the inlet and outlet side of the working medium. While in this way a dead space of minor proportion is created, the said beveling has the advantage of considerably increasing the inlet and outlet cross section between the outer and inner rotary piston. Furthermore, the flanks of the tooth tips of the inner rotary piston will extend in radial direction to an increased extent.

In view of the high circumferential speed, it is necessary that the cycloidal guiding surface of the outer rotary piston for guiding the inner rotary piston be designed with maximum precision. To this end, the outer rotary piston is composed of two parts. The inner part or insert which comprises the cycloidal surface is open toward both end sides so that the cycloidal shape may be produced by planing, reaming, milling or grinding. The rather thin walled insert is connected with the end wall of the outer part by relatively weak screws. These screws which are subjected to shearing stresses do not assure a safe connection between the inner and outer part during the operation. This is done rather by pressing the insert against the outer solid part with the aid of centrifugal force due to its non-cyclic shape and its non-uniform expansion. For purposes of obtaining this effect, it will suffice if the circumferential surface of the outer part surrounds the insert along a fraction only of its length.

With rotary piston engines in which the cylinder chambers as illustrated by way of example in the drawings are sealed merely by gaps, it is not recommended to discharge into the atmosphere or the suction conduit the leakage gases which pass into the casing and into the bearing chamber for the inner rotary piston. In view of the leakage losses it is rather advisable to place these chambers under a gas pressure which is lower than the counter pressure but is higher than the suction pressure of the machine. This may be effected in a very simple manner by designing the machine casing as well as the bearing chamber for the inner rotary piston in a closed manner. As a result thereof, due to the quantities of leakage gas an intermediate pressure will automatically establish itself.

A particular difficulty is encountered in connection with the lubrication of the bearings of high speed rotary piston engines. With the heretofore known engines of this type, sliding bearings with grease lubrication or sliding bearings with circulatory lubrications are customarily employed. Both types have considerable disadvantages inherent thereto. In the first instance, no continuous proper grease supply can be assured and a stronger temperature sensitivity will prevail. In the last instance, an oil pump including conduits, check valves and oil coolers will be required. This drawback has been overcome according to the present invention by feeding the lubricating oil to the bearings by means of wicks which slide along the moved parts, while the lubricating oil is withdrawn from containers which may form a part of the casing or the bearing pivot or the lid for the casing.

At high gas pressures and correspondingly increased bearing temperatures, a cooling of the bearings will be necessary. This cooling, especially of the bearing of the inner rotary piston which bearing is accessible only under difficulties is with the bearing pivot designed stationary made possible according to the present invention by providing a chamber in addition to the oil storage chamber which first mentioned chamber is passed through by a cooling fluid. Inasmuch as the space passed through by the cooling fluid surrounds the oil storage chamber either entirely or partly, also a heating up of the lubricating oil will be prevented.

If the machine is flanged to a transmission box, it is advantageous in various respects to journal the outer rotary piston in a casing of which that end which faces the transmission is open. This makes it possible in conformity with the suggestion according to the present invention to arrange the driving gear between the bearings of the outer rotary piston. Such an arrangement on the strong and therefore bend-resistant shaft journal of the rotary piston brings about a smooth quiet running of the gears without additional structural elements. A bore provided in the shaft journal freely extending into the transmission box makes it possible to carry out the lubrication of the inner rotary piston in a most simple manner from the transmission box. The bore itself may be laid out in any desired manner in conformity with the respective requirements of operation.

*Structural Arrangement*

Referring now to the drawings in detail, the work performing outer driven rotary piston 1 rotates about its axis 2 in clockwise direction with regard to FIG. 2 and while doing so carries along the inner piston 3 rotating the same about the axis thereof. The outer rotary piston is by means of friction or anti-friction bearings 2a unilaterally journalled in the casing 5 in an overhung position, while the inner rotary piston is likewise unilaterally journalled on bearings 3a in the lid 6 connected in any convenient manner to the casing 5. Rotatably mounted in an annular recess 6a of the lid 6 is a control disc 7 which comprises the inlet slot 8 and the outlet slot 9 and which may be adjusted circumferentially in conformity with the respective requirements. The said control disc 7 may, if desired, be designed with a hollow 107 filled with a cooling fluid or passed through by a cooling fluid. The inner rotary piston 3 has that side thereof which faces the control disc 7 provided with beveled portions 10. The said rotary pistons form between themselves working chambers 11, 12, 13, 14 and 15. When the said rotary pistons rotates, the chambers 11 and 12 increase in volume and take in gas through the slot 8. The chamber 13 decreases in volume without communicating with the slots 8 or 9 so that a compression of the taken-in gas will be effected. The chambers 14 and 15 likewise decrease in volume and displace the compressed gas through the slot 9 into the pressure conduit. Especially chamber 15 shows to what great extent the beveled portion 10 increases the laterally free discharge opening between the rotary pistons.

The teeth 16 of the inner rotary piston, according to this invention, have, as mentioned previously, only slightly rounded tooth tips 17. More specifically, these tooth tips are preferably rounded with a radius which does not exceed from 1 percent to 3 percent of the diameter of the inner rotary piston. The tooth spaces 18 of the outer rotary piston are, of course, shaped in such a manner as to receive the tips of the teeth of the inner piston.

The highly pointed tooth tips on the inner rotary piston tend to balance out circumferential forces exerted on the inner rotary piston, so that it operates quietly, even when the working medium is a gas.

The aforementioned beveled portions 10 formed at the ends of the tooth spaces of the inner rotary piston facilitate the flow of gas to and from the working spaces between the pistons by presenting a large area at the ends of the said tooth spaces that provides for substantially complete exposure of the ports 8 and 9 during operation of the rotary motor.

This invention includes modifications falling within the scope of the appended claims.

What I claim is:

1. In a rotary piston compressor, an outer internally toothed piston, an inner externally toothed piston inside the outer piston and eccentric thereto, means supporting said pistons for rotation on their respective axes, means for driving the outer piston in rotation and the inner piston being driven by the outer piston, a casing enclosing the pistons and including port means in one end wall communicating with the spaces between said pistons for the movement of gas being compressed through the compressor, the teeth of said outer piston when viewed in the axial direction being wide with respect to the height thereof and the tooth spaces therebetween being narrow, the teeth of said inner piston when viewed in the axial direction being narrow with respect to the height thereof and tapering inwardly toward the tips, said tips of the teeth of the inner rotary piston being rounded with a radius which does not exceed from 1% to 3% of the diameter of said inner rotary piston whereby the circumferential forces exerted by the gas being compressed on the sides of the teeth of the inner rotary piston are substantially balanced.

2. A rotary piston compressor according to claim 1, in which the bottoms of said tooth spaces of the said inner rotary piston at the ends thereof adjacent said port means are beveled inwardly toward the center of the inner rotary piston to provide for full exposure of said port means for efficient flow of gas into and out of the compressor.

References Cited in the file of this patent
UNITED STATES PATENTS

| | | |
|---|---|---|
| 1,416,884 | Schmidt | May 23, 1922 |
| 1,486,835 | Hill | Mar. 11, 1924 |
| 1,863,335 | Hill | June 14, 1932 |
| 2,386,896 | Hill et al. | Oct. 16, 1945 |
| 2,389,728 | Hill | Nov. 27, 1945 |
| 2,417,701 | Parsons | Mar. 18, 1947 |
| 2,492,672 | Wood | Dec. 27, 1949 |
| 2,601,397 | Hill et al. | June 24, 1952 |
| 2,621,603 | Thomas | Dec. 16, 1952 |
| 2,664,323 | Alford | Dec. 29, 1953 |
| 2,692,559 | Rogers | Oct. 26, 1954 |
| 2,723,626 | Endebak | Nov. 15, 1955 |
| 2,812,722 | Reed | Nov. 12, 1957 |
| 2,822,124 | Klessig et al. | Feb. 4, 1958 |
| 2,835,437 | Boynton | May 20, 1958 |
| 2,858,975 | Feilden | Nov. 4, 1958 |